Figure 3:
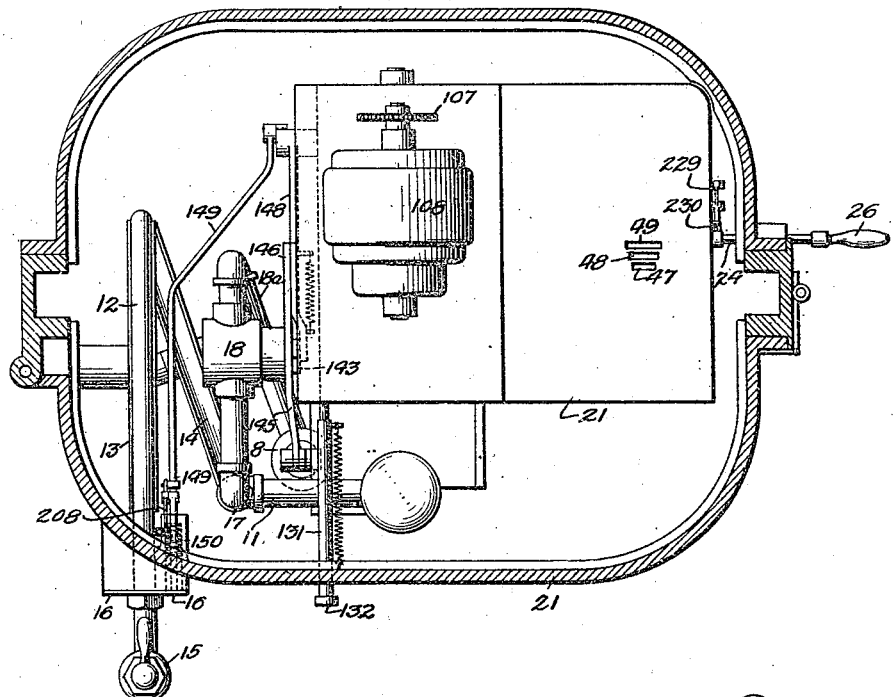

G. C. K. CULMER.
LIQUID VENDING MACHINE.
APPLICATION FILED APR. 11, 1916.
1,194,145.
Patented Aug. 8, 1916.
11 SHEETS—SHEET 1.
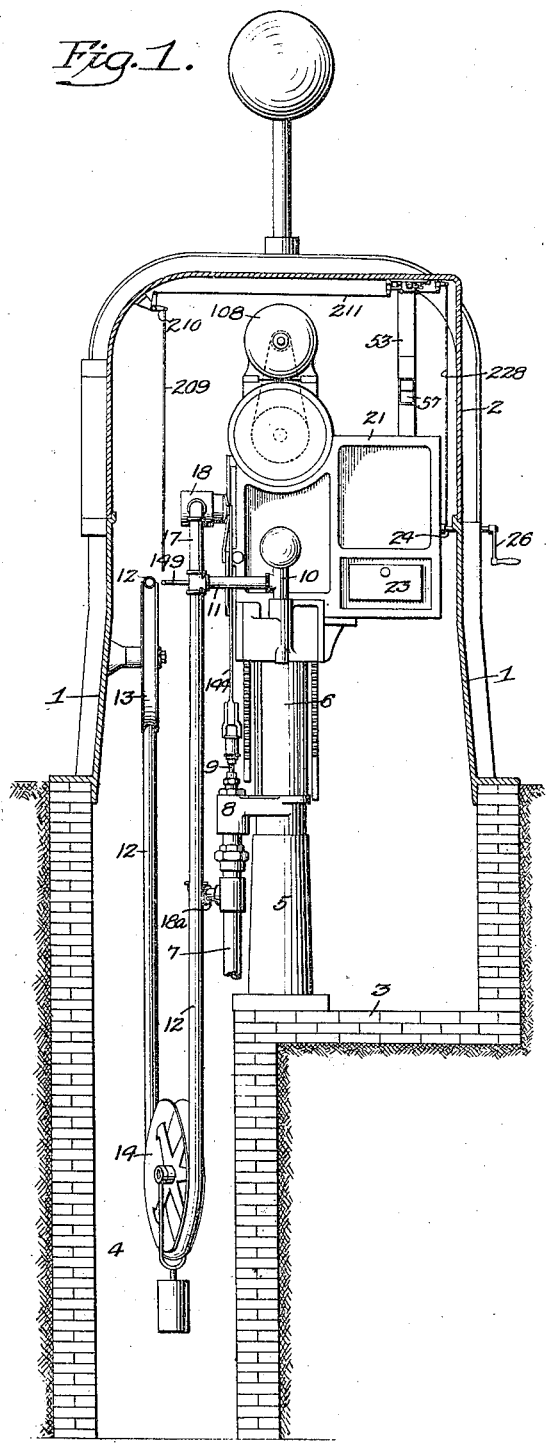
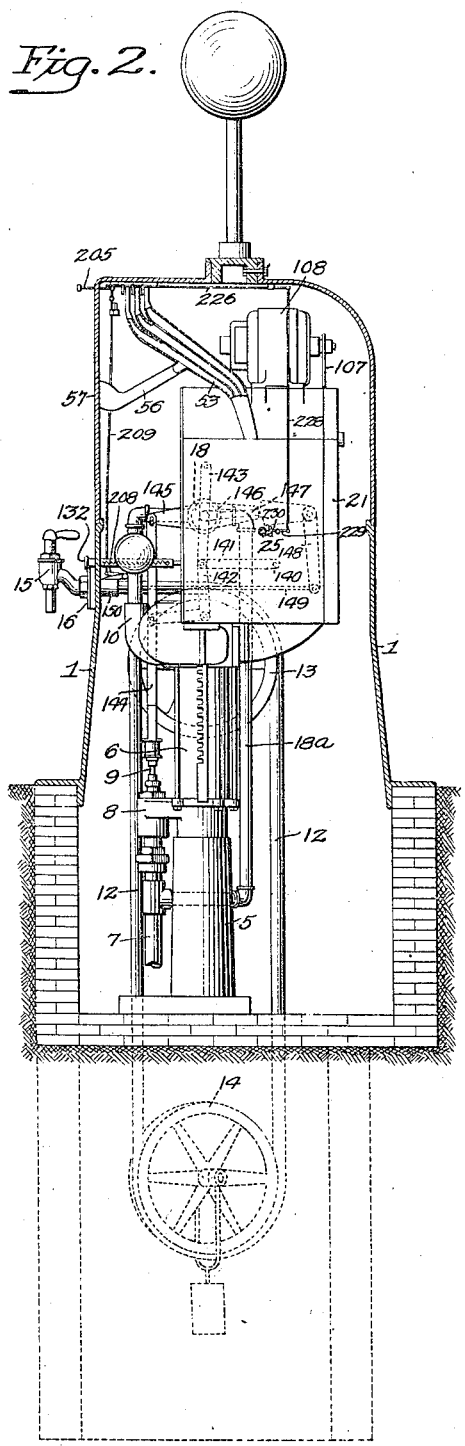
Inventor- George C. K. Culmer, by his Attorneys
Howson & Howson

G. C. K. CULMER.
LIQUID VENDING MACHINE.
APPLICATION FILED APR. 11, 1916.

1,194,145.

Patented Aug. 8, 1916.
11 SHEETS—SHEET 2.

Inventor.—
George C. K. Culmer
by his Attorneys
Howson & Howson

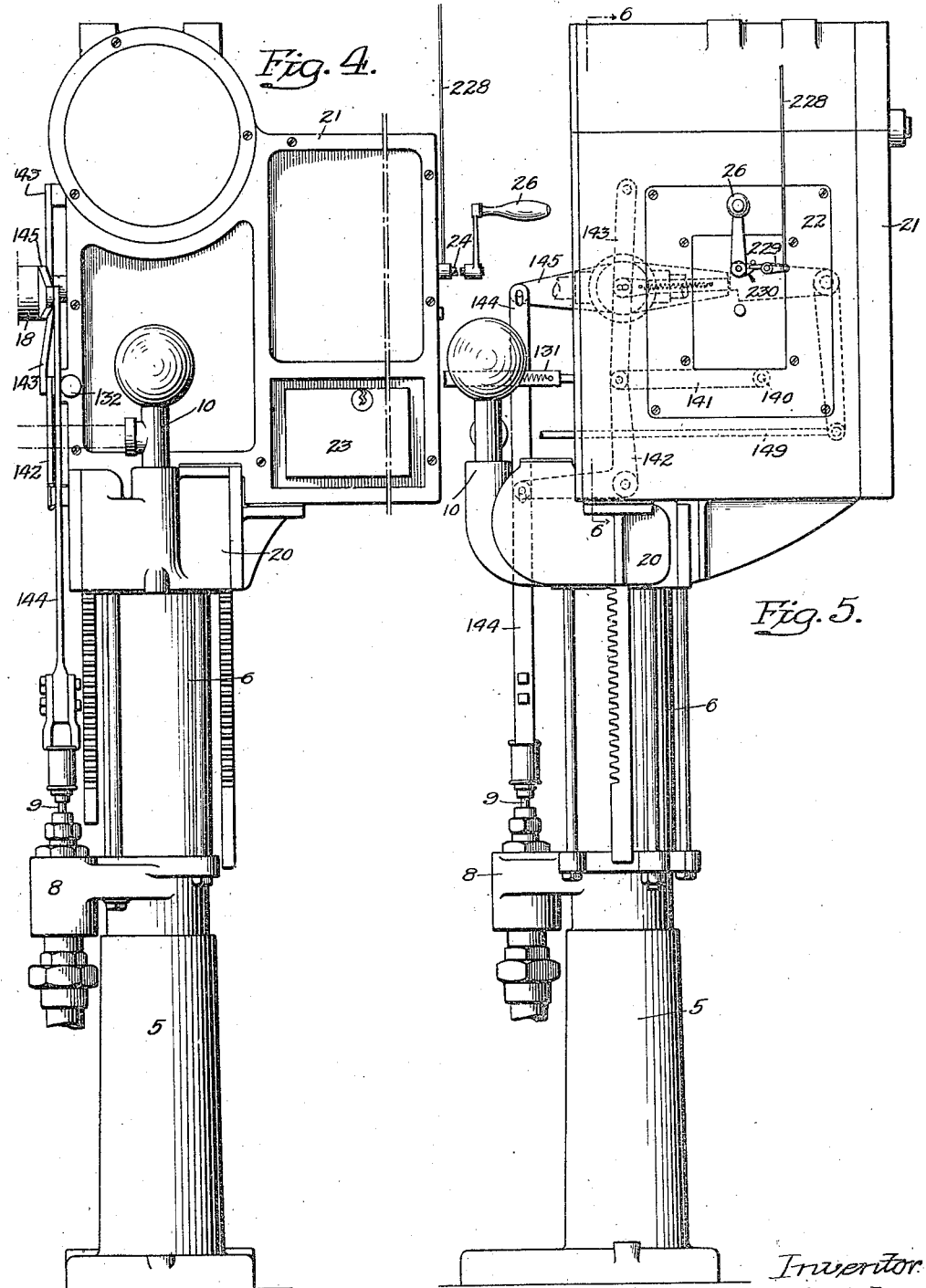

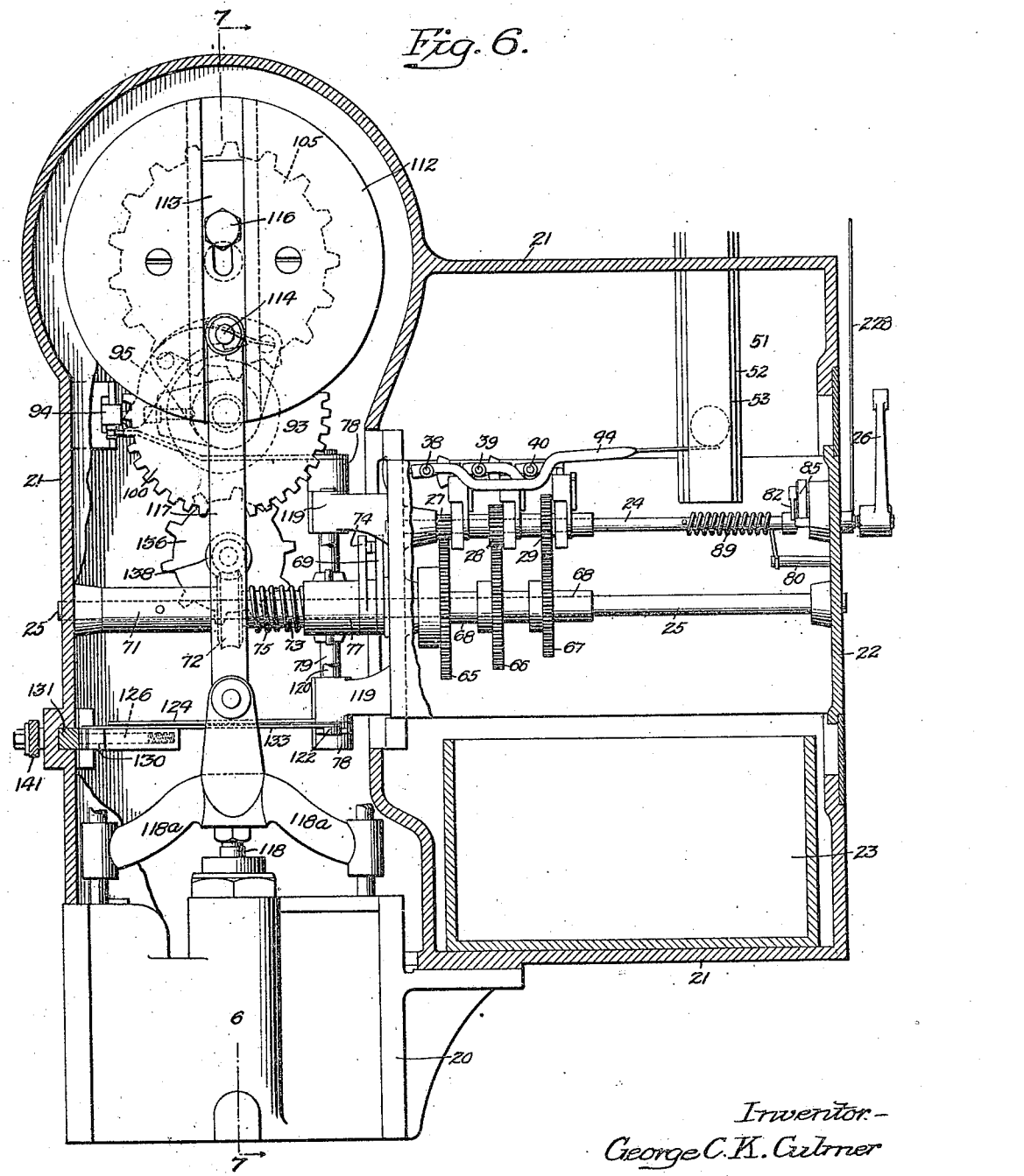

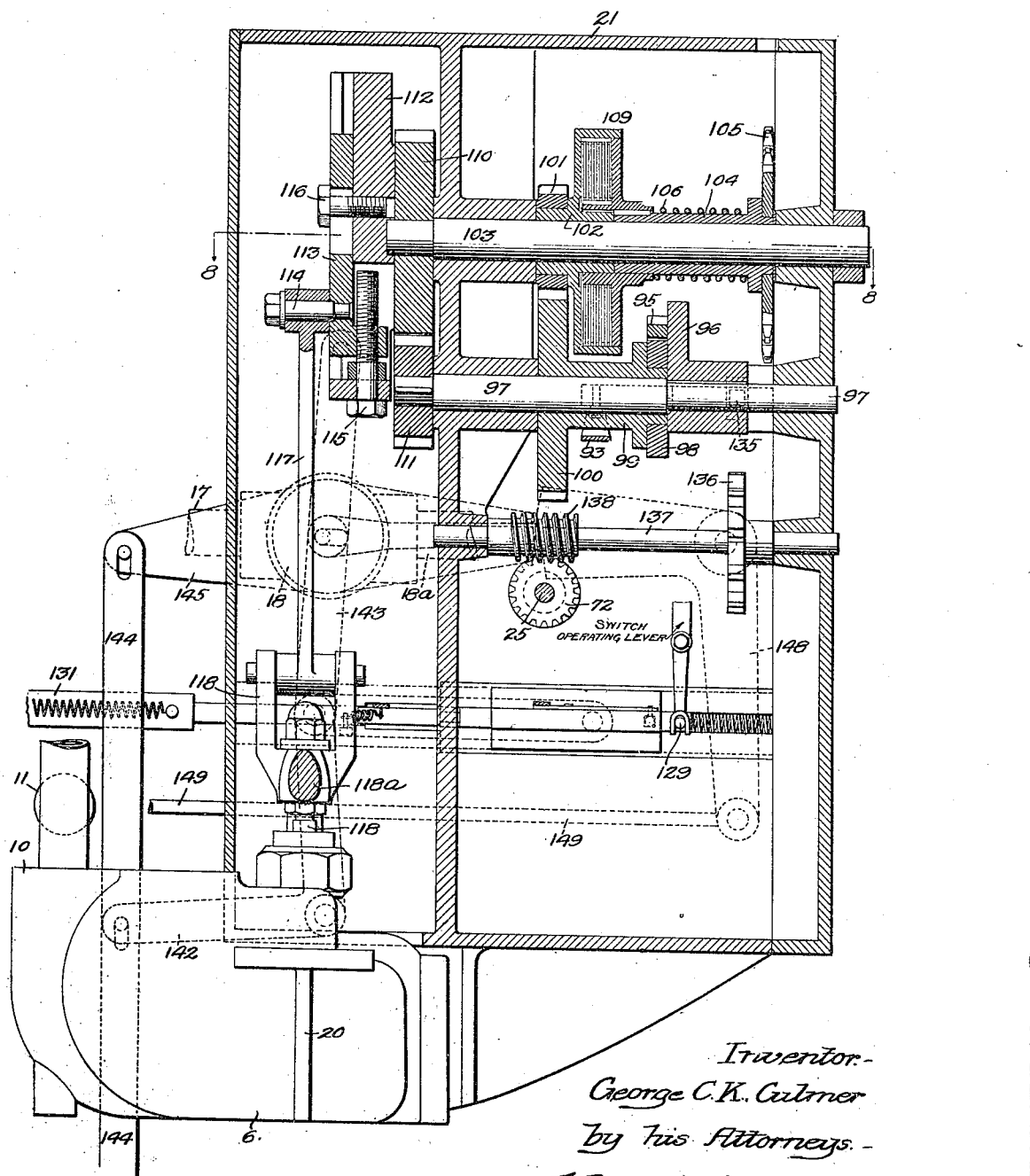

Inventor.
George C.K. Culmer
by his Attorneys
Howson & Howson

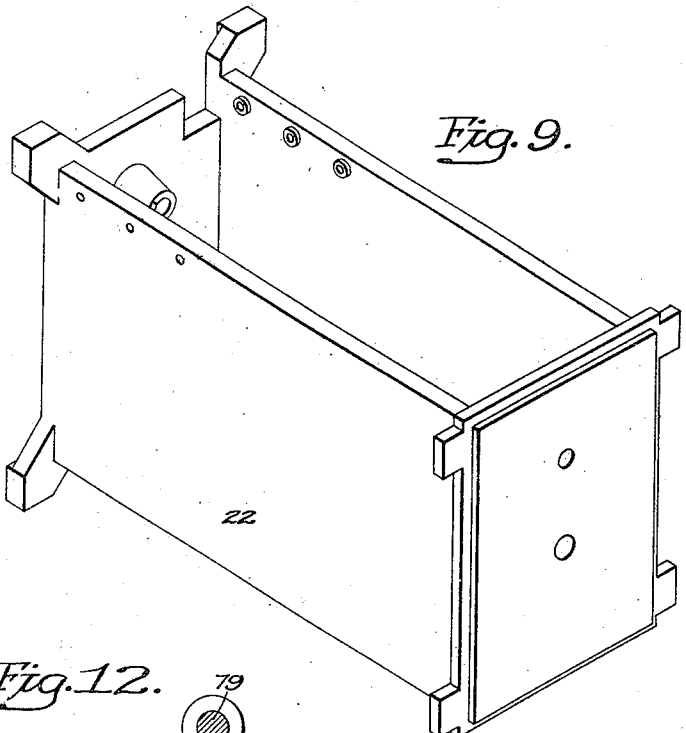
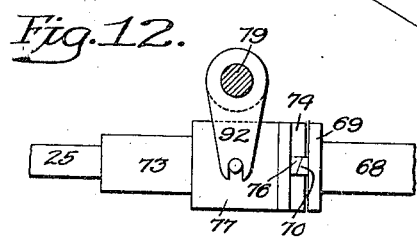
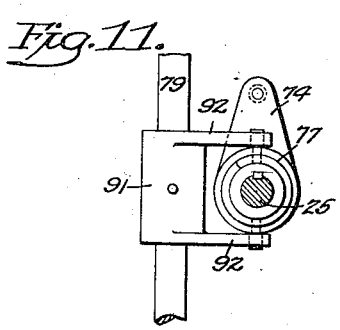
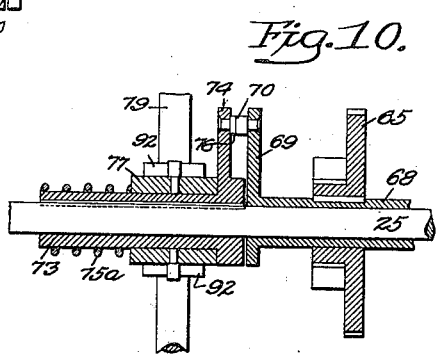

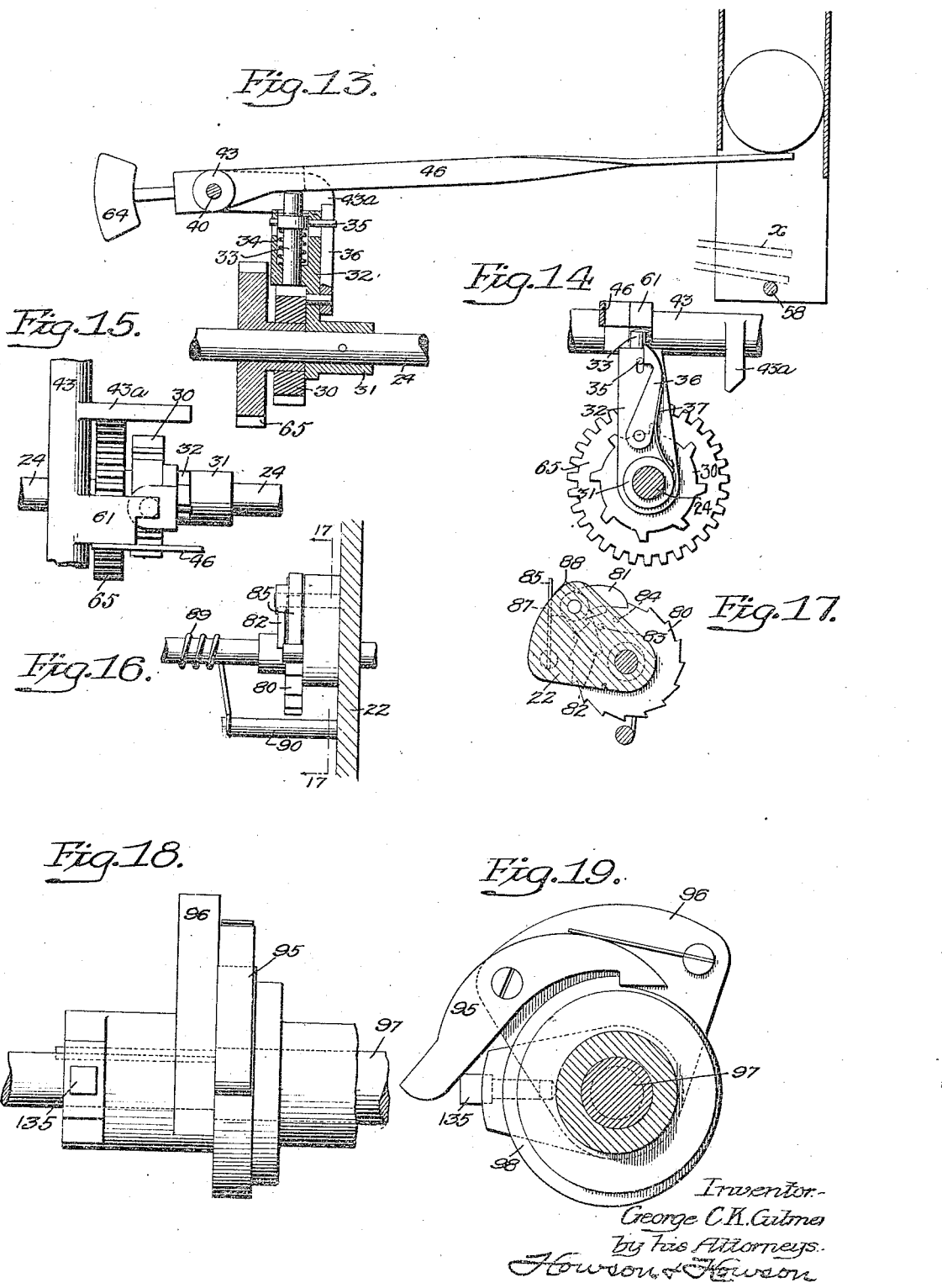

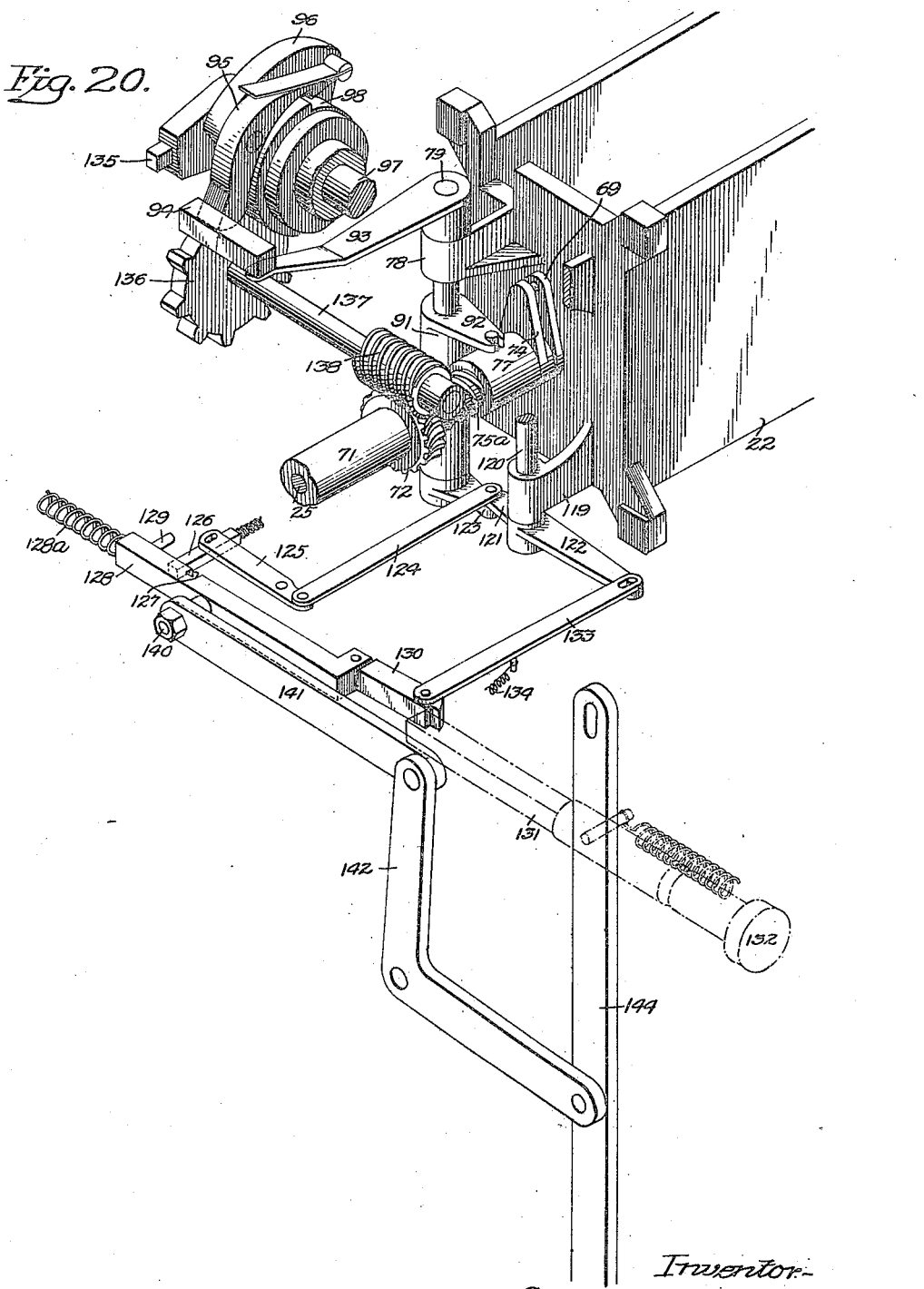

G. C. K. CULMER.
LIQUID VENDING MACHINE.
APPLICATION FILED APR. 11, 1916.

1,194,145.

Patented Aug. 8, 1916.
11 SHEETS—SHEET 10.

Inventor:-
George C. K. Culmer
by his Attorneys
Howson & Howson

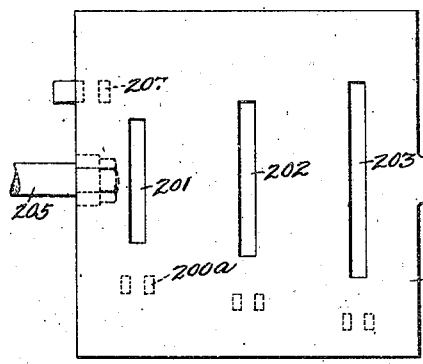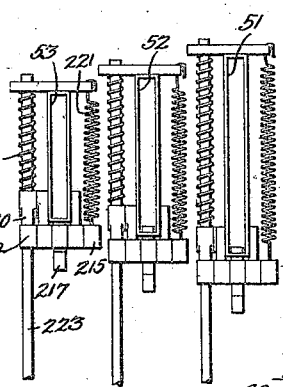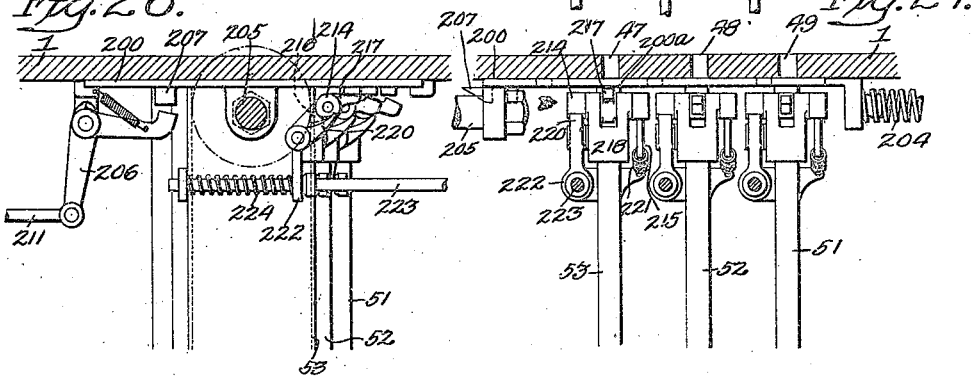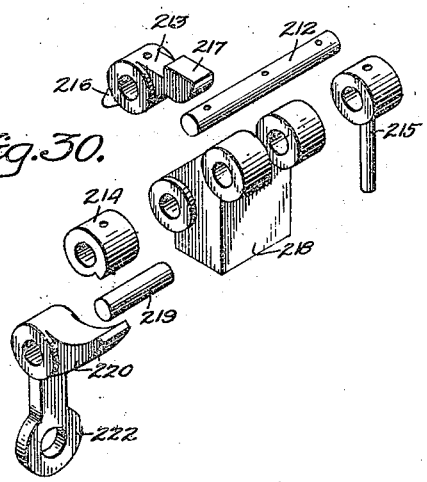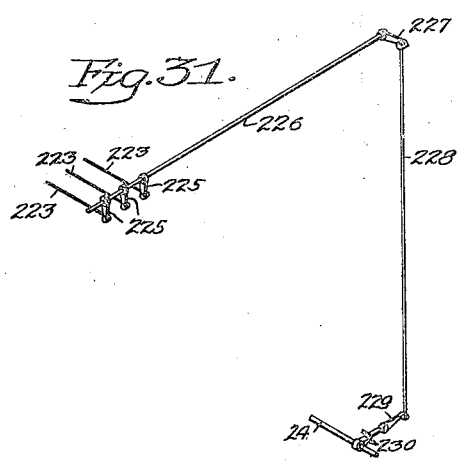

UNITED STATES PATENT OFFICE.

GEORGE C. K. CULMER, OF PHILADELPHIA, PENNSYLVANIA.

LIQUID-VENDING MACHINE.

1,194,145.        Specification of Letters Patent.        Patented Aug. 8, 1916.

Application filed April 11, 1916. Serial No. 90,414.

*To all whom it may concern:*

Be it known that I, GEORGE C. K. CULMER, a citizen of the United States, residing in Philadelphia, Pennsylvania, have invented a Liquid-Vending Machine, of which the following is a specification.

One object of my invention is to provide a relatively simple, compact and substantial device which will automatically deliver a predetermined amount of liquid when a coin or token of proper denomination is deposited therein and certain members are operated, the invention contemplating a novel arrangement and construction of mechanism for attaining this end.

It is further desired to provide a vending machine, designed to receive any one of several coins or tokens of different denominations or dimensions, which shall be capable of automatically delivering an amount of liquid corresponding to the particular coin or token deposited.

Another object of the invention is to provide a novel coin-controlled mechanical device for starting and thereafter stopping the operation of a motor;—the arrangement of parts being such that the mechanism actuated by said motor shall be driven to a predetermined constant extent at each successive operation while being capable of adjustment at will to vary the quantity of liquid delivered.

I also desire to provide a novel form of driving mechanism whereby a pump may be caused to make a predetermined number of strokes and thereafter be stopped;—the invention including a relatively simple and reliable combination of apparatus especially intended for,—although by no means restricted to, control by one or more coins or tokens, and which shall be of such design as to cause the number of strokes made by the pump to be dependent upon the particular denomination or dimensions of the coin or upon the extent to which a controlling member is primarily actuated.

I further desire to provide a machine of the above noted class with means whereby liquid will be automatically by-passed in the event of the apparatus being put in operation or permitted to operate while the controlling valve of the liquid delivery conduit is closed, the mechanism also including an element permitting operation of the driving motor independently of the pump in case flow of liquid from the latter is prevented.

The invention also contemplates novel mechanism for preventing two or more coins of different denomination being inserted in such manner as to block or injure the apparatus.

Figure 21:
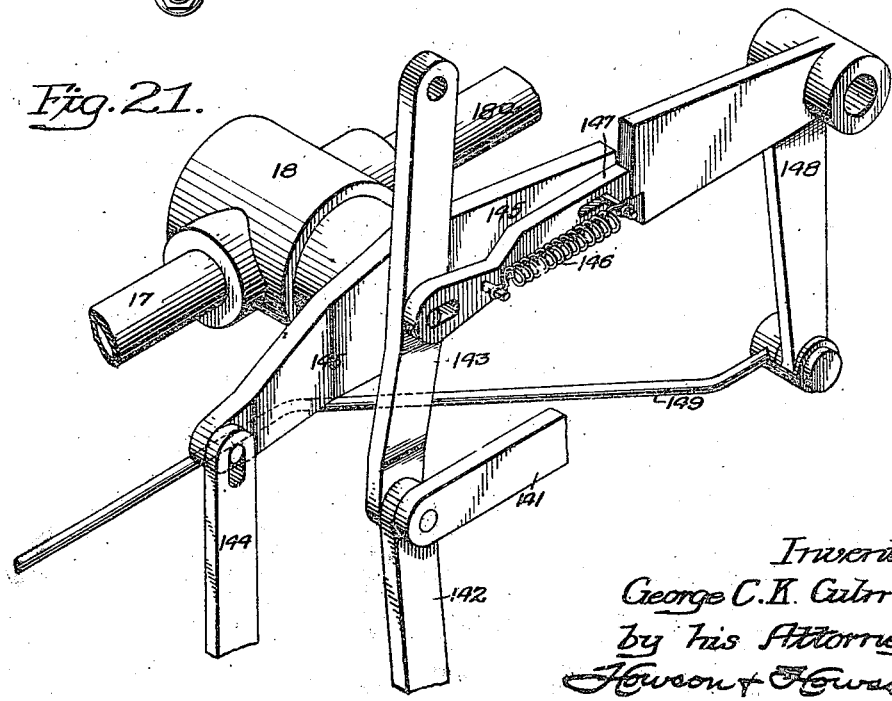
Figure 8:
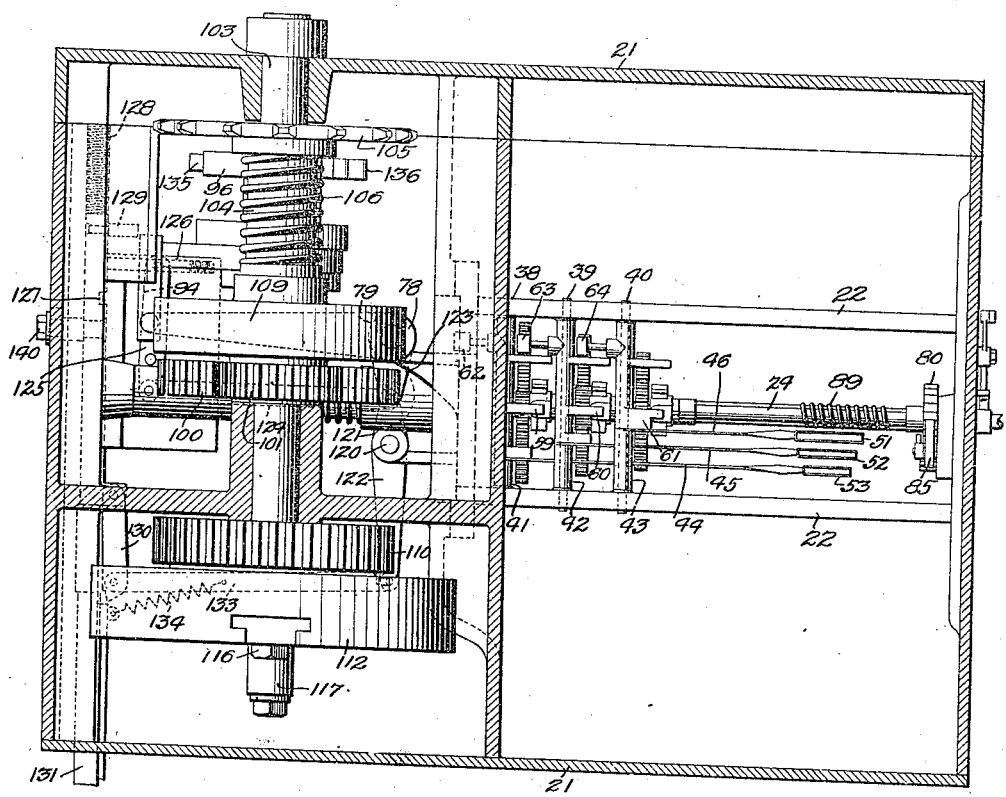
Figure 23:
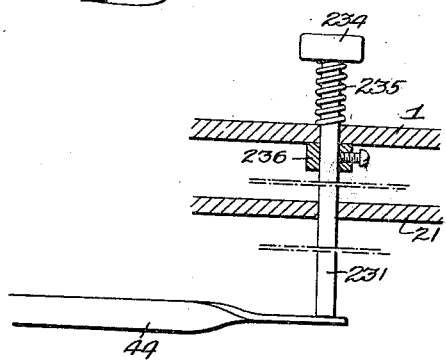
Figure 22:
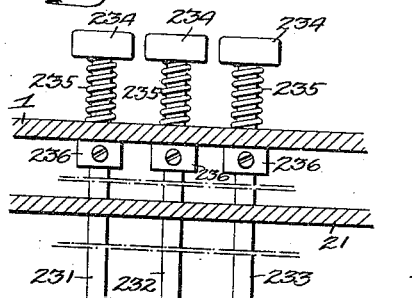
Figure 24:
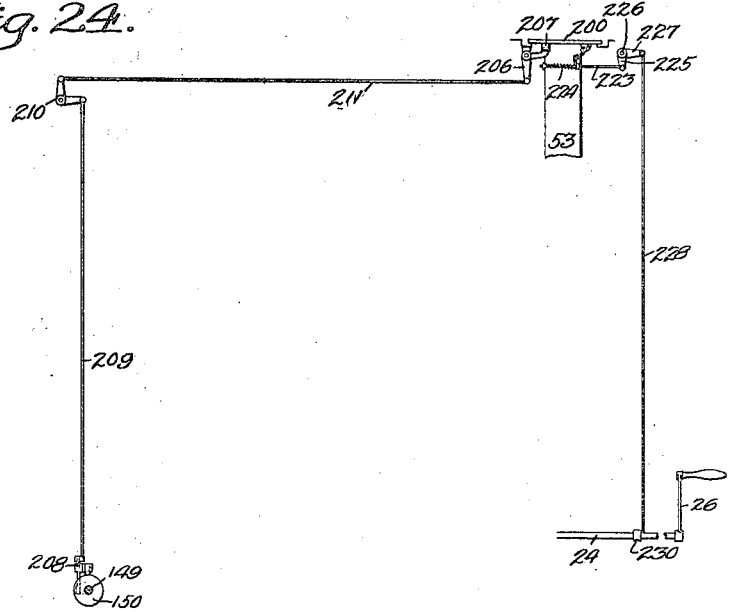
Figure 25:
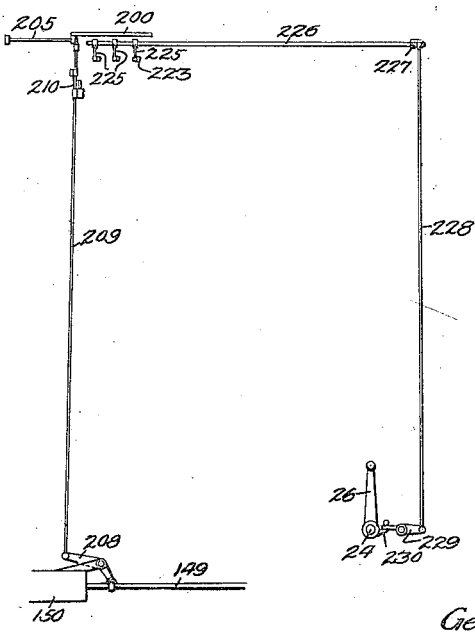

These objects and other advantageous ends I secure as hereinafter set forth, reference being had to the accompanying drawings, in which, Figures 1 and 2 are two vertical sections taken at right angles to each other, illustrating the general arrangement of a liquid vending machine constructed according to my invention; Fig. 3 is a plan partly in section and on a larger scale, further illustrating the machine shown in Figs. 1 and 2; Figs. 4 and 5 are front and side elevations respectively of the main portions of my vending machine upon a larger scale than Figs. 1 and 2; Fig. 6 is an enlarged vertical section on the line 6—6, Fig. 5; Fig. 7 is a vertical section on the line 7—7, Fig. 6; Fig. 8 is a horizontal section on the line 8—8, Fig. 7; Fig. 9 is a perspective view of the box-like frame containing the mechanism directly acted upon by the coin or coins by which the machine is controlled; Fig. 10 is a vertical longitudinal section of a portion of the coin governed mechanism; Fig. 11 is an elevation, partly in section, of the mechanism shown in Fig. 10; Fig. 12 is a plan partly in section of the structure shown in Fig. 11; Fig. 13 is a longitudinal section of one of the coin controlled plungers and its associated mechanism; Figs. 14 and 15 are a side elevation partly in section and a plan further illustrating the mechanism shown in Fig. 13; Fig. 16 is a side elevation, illustrating the ratchet mechanism associated with the hand operated shaft; Fig. 17 is a vertical section on the line 17—17, Fig. 16; Figs. 18 and 19 are respectively side and end elevations partly in section showing certain details of the mechanism constituting my invention; Figs. 20 and 21 are perspective views illustrating the preferred arrangement of the connecting links and levers with their associated parts; Figs. 22 and 23 are fragmentary elevations, partly in section, illustrating means for manually controlling the operation of the machine in case this should be desirable; Figs. 24 and 25 are elevations at right angles to each other and to some extent diagrammatic, showing one form of mechanism which may be employed to prevent the simultaneous introduction of two or more coins of different denominations; Figs. 26 and 27 are elevations at right angles to each other and partly in section, illustrating the slide closing plate and certain of its associated mechanism; Fig. 28 is a plan of the slot closing plate; Fig. 29 is a plan of the locking mechanism associated with the slot closing plate; Fig. 30 is a detached perspective of the plate locking mechanism associated with one of the coin slots; and Fig. 31 is a perspective illustrating certain of the connections between the plate locking mechanism and the operating handle.

In Figs. 1 and 2 of the above drawings, 1 represents an inclosing metal casing having a removable cover 2 and mounted over a vault or masonry lined cavity, providing a foundation 3 for the support of a mechanism hereafter described and having a well 4 for a counterweighted conduit 12. Mounted upon the foundation 3 is a base 5 supporting a vertically set pump cylinder 6 whose intake conduit 7 is connected to a source of liquid, which in the case of gasolene, is preferably in the form of an underground tank (not shown). The flow of liquid through this conduit into the pump cylinder is regulated by a normally closed valve mounted in a casing 8 and controlled by a vertically movable spindle 9. The outlet conduit 10 of the pump has a horizontally extending branch 11 connected to one end of a flexible delivery conduit 12 normally hanging in the well 4 and having its other end extended over a pulley 13 mounted within the casing 1, there being a counterweighted pulley 14 hung in a loop of said conduit. After passing over the pulley 13 the conduit 12 extends through an opening in the side of the casing 1 and terminates in a stop valve or faucet 15, there being a plate or disk 16 mounted upon the latter concentric with the conduit and normally held thereby flat against a suitable face plate upon or forming a portion of the outside of said casing. The pipe 11 is also connected through a conduit 17 to a by-pass valve 18 which through a conduit 18ᵃ is connected to the inlet pipe 7. Mounted on the upper end of the pump cylinder 6 is a casting 20 (Figs. 4, 5 and 6) which in turn supports a casing 21 having removably mounted within it a box-like frame 22 supported above a money drawer 23.

Journaled within the frame 22 are two substantially parallel shafts 24 and 25 (Figs. 6 and 8) of which the first extends outside of the casing 21 and through the wall of the main casing 1, where it terminates in an operating handle 26. On said shaft 24 is fixed a ratchet wheel 80 (Figs. 6, 16 and 17) adjacent which a pawl 81 is pivotally mounted on the wall or end of the frame 22 in position to engage said ratchet and allow of revolution of the shaft 24 in but one direction. This pawl has projecting from it an arm 82 designed to coöperate with or be operated upon by either of two pins 83 and 84 projecting from the ratchet wheel 80. A spring 85 is so mounted as to engage either of two flat faces 87 or 88 of the pawl structure 81 and yieldingly hold said pawl either in position to engage the teeth of the ratchet wheel 80 or in a position clear of said teeth. The shaft 24 is returned to and normally held with its handle 26 in a definite position by a spring 89 coiled around and fixed at one end to it, the other end of said spring being fixed to a post 90 on the frame 22. This same shaft 24 has loosely mounted upon it a number of different sized gears 27, 28 and 29, depending upon the number of coins it is desired the machine shall receive and be operated by, and a typical one of said gears is illustrated in Figs. 13, 14 and 15, as having connected to it a toothed wheel 30, immediately adjacent which is a collar 31 fixed to said shaft 24. This collar carries an arm 32 in which a plunger 33 is slidably guided in a radial line toward and from the toothed wheel 30, although it is normally held by a spring 34 out of engagement with the same.

Extending laterally from the plunger is a pin 35 designed to coöperate with a latch pivotally mounted on one side of the arm 32 and normally pressed toward said pin by a spring 37, the arrangement being such that when the plunger 33 is in position to be engaged by or intercept one of the teeth of the wheel 30, the pin 35 occupies such a position as to permit the latch 36 to extend over and retain it with the plunger in this engaged position.

Extending across the top of the frame structure 22 and journaled in the sides thereof are three spindles 38, 39 and 40, Figs. 6 and 8, on which are mounted three sleeves 41, 42 and 43 respectively provided with relatively elongated horizontally extending parallel arms 44, 45 and 46.

As shown in Fig. 2, the cover 2 of the main casing has in it three coin slots 47, 48 and 49 and these open into a chute structure 50, terminating in three parallel guide-ways 51, 52 and 53 within the casing structure 21. The chute leading from the slot 47 has a passage or opening 54 leading into the chute from the slot 48, and this opening is of such a width as to permit of the passage through it of any coin or token entering the slot 47 but which is of less diameter than that of the guide-way 51. Similarly there is a passage 55 connecting the guide-way 52 below the passage 54 with the guide-way 53 and designed to divert from said chute 52 any coin smaller than that which it is designed to receive. Finally a return chute 56 leads from the guide-way 53 and terminates in a cup-shaped enlargement immediately adjacent an opening 57 in the side of the cover 2 the opening to this conduit being such as to permit of the entrance into it of any coin whose denomination and therefore whose diameter is less than that which the guideway 53 is designed to receive. In the present instance the three guide-ways 51, 52 and 53 are intended to receive coins of the denomination of one dollar, fifty cents and twenty-five cents respectively, and they terminate immediately adjacent the ends of the three levers 44, 45 and 46 which extend into them, Figs. 6, 8 and 13. Each conduit at its lower end has one side cut away to permit of the entrance of its particular lever and its opposite side is also removed to permit of the discharge of a coin, there being a pin 58 extended between its two faces at its lower extremity to limit the downward movement of said lever. The sleeves 41, 42 and 43 (Fig. 8) in addition to their projecting levers, have arms 59, 60 and 61 respectively extending over the plungers 33 carried by the shaft 24, and they are also provided with weighted arms 62, 63 and 64 designed to balance to a greater or less extent, the weight of the arms 44, 45 and 46 respectively. The sleeves also have suitably placed lugs 41ª, 42ª 43ª positioned to engage the latches 36 of their respective plungers 33 in order to cause these to disengage the plunger pins 35, after they have rotated with the shaft 24 through a predetermined angle.

The three gears 27, 28 and 29 on the shaft 24 respectively mesh with three other gears 65, 66 and 67 fixed to a sleeve 68 (Figs. 6 and 10) loosely mounted on the shaft 25 which extends longitudinally through the frame 22 and is journaled in the far side of the casing 21. This sleeve 68, just beyond the inner end of said frame, has fixed to it an arm 69 (Figs. 10 and 20) from whose outer end projects a pin 70 whose extremity is beveled or inclined to a plane radial to the shaft 25. Splined to this shaft between the arm 69 and a sleeve 71 which extends to the wall of the casing 21, is a sleeve 73 having fixed to it a collar 77 and also having a projecting arm 74 similar to the arm 69 toward which it is at all times pressed by a spring 75ª. This latter is mounted between the collar 77 and a worm wheel 72 fixed to the sleeve 71 which is keyed or otherwise fixed to the shaft 25. Said arm 74 is also provided with a projecting pin 76 beveled or inclined on its outer face and positioned to coact with the pin 70 on the arm 69.

Projecting from the rear or inner face of the frame 22 is a pair of bearings 78 in which is rotatably mounted a vertical shaft 79 having fixed to it a sleeve 91 from which projects a pair of arms 92 respectively above and below the collar 77 to which their ends are pivoted by pins (Figs. 10, 11, 12 and 20) so that a movement of the sleeve 73 longitudinally of the shaft 25 will swing or turn the shaft 79 through a greater or less angle. The same shaft 79 has projecting from it an arm 93 whose outer extremity is connected to a slidable bar 94 designed to be projected into or removed from the path of a lever 95 (Figs. 6, 7, 8 and 20) by an oscillatory movement of said arm 93.

The lever 95 (Figs. 18, 19 and 20) is pivoted on an arm 96 fixed to a shaft 97 journaled in suitable bearings provided by webs or partitions within the casing structure 21, and while one end of said lever is designed to coöperate with the bar 94, its opposite end is hooked so as to be capable of engaging a tooth formed in the periphery of a wheel 98 fixed on the shaft 97. This same sleeve has fixed to or formed integral with it a gear 100 meshing with a second gear 101 on a sleeve 102 loose on a shaft 103 likewise mounted in bearings of the casing structure 21 and lying parallel with the shaft 97. Also mounted on the sleeve 102 is one member of a friction clutch 109 whose second member is splined to a sleeve 104 loose on the shaft 103 and having fixed to it a sprocket wheel 105; there being a spring 106 on this sleeve acting to force the two members of the clutch 109 into operative engagement while permitting them to slip if more than a predetermined load is applied.

The sprocket wheel 105 is operatively connected by a chain 107 to a second sprocket wheel on the armature shaft of a motor 108 (Figs. 1 and 2), which is shown in the present instance as mounted on the casing 21, so that power is transmitted from the motor to the sprocket 105, through the clutch 109 to the gear 101 and thence to the gear 100. A second gear 110, Fig. 7, loose on the shaft 103 meshes with a gear 111 fixed to the shaft 97, and has mounted upon its outer face a crank disk 112 having a radially extending guide-way in which a block 113 is slidable. This block carries a crank pin 114 and is adjustable in its guide-way by means of a bolt 115, to vary the distance of said pin from the center line of the shaft 103. A second bolt 116 mounted in the disk 112 passes through a slot in the block 113 and may be set up to clamp the latter in any given position.

A connecting rod 117 extends between the crank pin 114 and a cross head 118ª attached to the piston rod 118 of the pump 6 so that said pump is operated by revolution of the crank disk 112. The inner end of the box-like frame 22, in addition to the bearings 78, carries a second set of bearings 119, Fig. 20, in which is mounted a vertical shaft 120 having fixed to it two arms 121 and 122. Of these, the first is pivoted to the end of an arm 123 fixed to the vertical shaft 79 and is also connected through a link 124 with one end of a lever 125 whose opposite end is connected by a pin to a spring-pressed locking bolt 126 slidably guided in a suitable bearing so as to be capable of entering a notch 127 in a switch operating bar 128. The latter carries a pin or projection 129 operatively connected in any desired manner to a switch (not shown) for controlling the operation of the motor 108, and at its opposite end this bar has pivotally connected to it a swinging arm 130 notched at its end so as to be capable of being engaged by the inner end of a push rod 131 whose opposite end projects outside of the main casing 1 where it is provided with a push button head 132.

The swinging arm 130 is connected through a link 133 with the outer end of the arm 122, which as before noted, is fixed to the vertical shaft 120. It is noted that the pin connecting the arm 122 with the link 133, as well as that connecting the lever 125 with the locking bolt 126, operates in a slot, so that movement of the arm 122 and of the lever 125 may be independent of the elements to which they are connected. A spring 134 is connected to the link 133 so as to tend to swing the arm 130 into position to be engaged by the push rod 131.

The sleeve carrying the arm 96 has projecting from it a pin 135 (Figs. 7, 18 and 19) designed to coöperate with the teeth of a wheel 136 fixed to a shaft 137 mounted in the casing 21 so as to lie parallel with the shafts 97 and 103, there being also fixed to it a worm 138 meshing with the worm wheel 72 which is fixed to the shaft 25.

For controlling the operation of the by-pass valve 18 and of the inlet valve 8 of the pump, I mount on the switch operating bar 128 a projecting post 140 (Figs. 8, 20 and 21) and through a link 141 connect this to one arm of a bell crank lever 142 and also to the lower end of a swinging arm 143. The second arm of the lever 142 is connected through a link 144 (Figs. 2 and 7) with the stem 9 of the inlet valve 8, and this link is also extended upwardly beyond said lever to an arm 145 connected to the movable element of the by-pass valve 18. The connection of the link 144 with the bell crank lever 142 and with the arm 145 is one which permits independent movement of said members under certain conditions and for this purpose said link is slotted to receive pins on said other elements.

The end of the arm 145 opposite that connected to the link 144 carries a slidable latch 147 normally tending to move outwardly under the action of a spring so as to coöperate with one arm of a bell crank lever 148, which is provided with a shoulder capable of engaging said latch and turning the arm 145 under certain conditions. Said latch also has a pin-and-slot connection with the arm 143 and the second arm of said lever 148 is connected to a slidable rod 149 which is mounted to project beyond the outer surface of the casing 1 when permitted to do so by the plate 16; there being a spring 150 (Fig. 3) connected to said rod so as to at all times tend to force it outwardly.

Under normal conditions the parts occupy the various positions shown in the drawings, and when it is desired to obtain a supply of liquid from the machine, a coin of one of the denominations for which the apparatus is adapted;—for example, a twenty-five cent piece, is placed in one of the coin slots. The handle 26 is then given about seven eighths of a revolution in a clockwise direction and released, and the head 132 is pushed in. As a result, the pump is put in operation, so that when the delivery faucet 15 is drawn outwardly and opened, a definite quantity of liquid is delivered, depending upon the denomination of the coin inserted. Upon the cessation of the flow from said faucet, the latter is returned to the position shown in Fig. 2, although, if for any reason the faucet should be closed before the full amount of liquid paid for is delivered, the machine continues to operate without damage to any of its parts;—the liquid which should have been delivered being by-passed and returned to the reservoir from which it was originally drawn.

In order to make possible the above noted series of operations the coin inserted falls through its chute until it rests upon the extremity of the lever 44, which is thereby depressed from the position shown in full lines in Fig. 13 to the position indicated at $x$ in dotted lines. Such downward movement of this lever depresses the corresponding plunger 33 so that its lower end lies in the path of the teeth of the wheel 30, in which position it is held because the spring 37 swings the latch 36 so that its hooked end extends over the pin 35. The subsequent revolution of the handle 26 through about seven eighths of a revolution likewise rotates the collar 31, the plunger 33, the wheel 30 and the gear 27, but obviously without affecting the gears 28 and 29, controlled by the coin actuated arms 45 and 46.

After the operator has moved the handle from its normal position, its backward movement is prevented by the ratchet wheel 80 and pawl 81 which is pressed toward said wheel by the action of the spring 85 on the surface 87. Toward the end of the rotary movement of the handle 26 and when it has been turned through about seven eighths of a revolution, the pin 84 strikes the arm 82 of the pawl, thus turning it on its pivot out of the path of the teeth of the ratchet wheel into a position in which it is held by the action of the spring 85 on the surface 88. The handle may now be returned to its off position or may be allowed to so move under the action of the spring 89, thus causing the pin 83 to ultimately come into engagement with the arm 82 on the pawl 81 and throwing the latter down into position to again engage and hold the teeth of the wheel 80. A suitable stop is provided on the casing 1 or at any other suitable point to prevent rotation of the handle 26 through more than the desired angle.

The first part of the revolution of the shaft 24 by the handle 26 carries the plunger 33 from under the arm 59 through which it was depressed by the action of the coin on the lever 44, but as before noted, said plunger is held in its inner position engaging the wheel 30, by the latch 36. As the shaft 24 nears the end of its rotary movement this latch strikes the projection 43ª on the sleeve 43 and is knocked out of engagement with the pin 35, thereby permitting the plunger 33 to disengage the toothed wheel 30 and return to its normal position under the action of its spring 34. Consequently as the shaft 24 moves in a counter-clockwise direction to its original position under the action of the spring 89, the wheel 30 and gear 27 are not affected.

The rotation imparted by the shaft 24 to the gear 27 turns the gear 65 together with the sleeve 68 and arm 69 through a definite angle, thus carrying the pin 70 of said arm out of engagement with the pin 76 of the arm 75 and permitting the latter to move longitudinally of the shaft 25 under the action of its spring 75ª toward the arm 69 from which it is spaced away a suitable distance (Figs. 10, 11 and 12). As a consequence, the arms 92 with the shaft 79 are swung through a small angle, thus likewise swinging the arm 93 and drawing the locking bar 94 from engagement with the lever 95 (Figs. 6 and 20). Said lever under the action of its spring is now free to move into the path of the single tooth of the wheel 98 so that the sleeve 99 is thus coupled through said lever and the arm 96, with the shaft 97, (Fig. 7).

The angular turning of the shaft 79, in addition to the above action, likewise turns the shaft 120 through the arms 123 and 121, and through the link 124 swings the lever 125 so that when the notch 127 is later brought in line wtih the locking bolt 126, this latter under the action of its spring and by reason of the slotted connection between it and said lever, will be free to move into said notch, (Fig. 20). The turning of the shaft 120 through the arm 122 and link 133 swings the arm 130 toward the adjacent end of the push rod 131, so that if the head of this latter is pushed inwardly by the operator, movement is communicated through said arm 130 to the operating bar 128. Such movement, through the pin 129, operates the motor controlling switch and starts said motor, the bar 128 being held in its inner position after the removal of the pressure on the head of the bar 131 by reason of the entrance of the locking bolt 126 into the notch 127.

The above noted longitudinal movement of the push rod 131 acts through the post 140, link 141 and bell crank lever 142 to move upwardly the link 144 and the valve stem 9, thus opening the valve 8 (Figs. 2, 5 and 7). The operation of the motor 108 rotates the sprocket wheel 105 (Fig. 7) and turns the member of the clutch 109 which is connected thereto, so that if the delivery faucet 15 be drawn outwardly to some point at which it is desired liquid shall be discharged and thereafter be opened, the second member of said clutch and the gear 101 are likewise turned. Power is thus transmitted from the gear 100 through the wheel 98, lever 95, arm 96 and shaft 97 to the gears 111, and 110 and so to the crank 112, which through the connecting rod 117 operates the pump in the well understood manner. Liquid is thereby drawn from the reservoir connected to the intake conduit 7 and is discharged through the conduits 10, 11 and 12 to the faucet 15. The movement of said faucet away from the casing 1 permits the outward movement of the rod 149 and the turning of the lever 148 into a position in which the latch bolt 147 lies under the shoulder of said lever. If now the faucet be closed while the motor is still operating, it is not possible for the pump to continue in operation and the clutch 109 slips. Should the faucet be released and be drawn into the position shown in Fig. 2, under the action of the weighted pulley 14 on its conduit 12, the plate 16 strikes the rod 149, thus turning the lever 148 on its pivot, swinging down the adjacent end of the arm 145. As a result the valve 8 through the lever 145 and the link 144, is held open and the pump continuous in operation, forcing liquid through the by-pass valve back to the reservoir. In any case, each revolution of the shaft 97 brings the pin 135 (Figs. 6, 7, 17 and 18) into engagement with one of the teeth of the wheel 136, thereby turning the shaft 137, the worm 138, and the worm wheel 72 on the shaft 25 in the direction opposite to that caused by the turning of the handle 26. After the predetermined number of strokes of the pump required to deliver the quantity of liquid paid for by the coin inserted, this turning of the shaft 25 so far turns the arm 74 as to cause its pin 76 to slide up on the pin 70, whereupon the sleeve 73 is moved longitudinally of the shaft 25 against the action of the spring 75ª, and turns the shaft 79 through a small angle in the direction opposite to that first noted. Through the arm 123, lug 124 and lever 125, the locking bolt 126 is withdrawn from the notch 127 of the switch operating bar 128, which under the action of the spring 128ª returns to the position shown in Fig. 8, operating the switch connected to the pin 129 and causing current to be cut off from the motor. This movement of the shaft 79 through the arm 93 slips the bar or bolt 94 into such position that it engages one arm of the lever 95 as this turns with the sleeve 99, raising it out of engagement with the teeth of the wheel 98 and thereby mechanically disconnecting the motor from the pump. The longitudinal movement of the switch operating bar 128 also causes the lever 142 to so move as to allow downward movement of the link 144 and closing of the valve 8.

The outward longitudinal movement of the switch operating bar 128, through the link 141, swings the lever 143 on the pivot through its upper end, thereby drawing the latch 147 out of engagement with the shoulder in the end of the adjacent arm of the bell crank lever 148. This same outward movement of the link 141 turns the lever 142 on its fulcrum and moves the link 144 downwardly, closing the valve 8 and turning the arm 145 so as to close the by-pass valve 18. The movement of the shaft 79, through the arms 123, 121, and 122 and link 133, swings the element 130 on its pivot so that any subsequent inward movement of the push rod 131 will not affect the switch operating bar 128.

The machine is now at rest and the various parts occupy their original positions, ready to be again put in operation upon the delivery to the machine of another coin. If one of the larger denomination coins be placed in its proper slot, one of the other levers 45 or 46 is depressed instead of the lever 44, thus temporarily locking the gear 29, for example, to the shaft 24. Since the gears 27, 28 and 29, as well as their co-operating gears 65, 66 and 67, Fig. 6, are all of the different sizes required for the proper operation of the machine, obviously the seven-eighths of a revolution of the shaft 24 will now turn the shaft 25 and the arm 69 through a much greater angle when the gears 29 and 67 are in use than when the gears 27 and 65 are operative. The pump will therefore make a correspondingly larger number of strokes before the operation of the wheel 136, worm 138 and worm wheel 72 turns the arm 74 into a position to again engage the arm 69 and put the machine out of operation as above described.

Obviously the detail arrangement and structure of the mechanism connecting the manually operated members and the devices actuated thereby may be widely varied without departing from my invention although I preferably utilize the construction shown and described herein.

If it should be desirable to provide means for preventing the accidental or malicious introduction of two coins of different denominations into their respective slots and the consequent jamming of the gears by simultaneously connecting two sets of them to the shaft 25, I provide the apparatus with mechanism such as that illustrated in Figs. 24 to 31 inclusive. For this purpose I mount a plate 200 in suitable guideways so that it is slidable against the under surface of that part of the top of the casing 1 having the coin slots 45, 46 and 47, and in this plate form three slots 201, 202 and 203 of the same size as the coin slots but at different distances apart. Said plate is normally held by means of a spring 204 in such position that all of the coin slots are closed but it may be moved from this position to bring any of its slots into register with them by means of a push rod 205 extending outside of the casing and provided with a head whereby it may be conveniently operated. The spacing of the slots 201, etc., is such that but one of them can be made to register with the casing slots at any time. This plate 200 is normally locked from movement by one arm of a bell-crank lever 206 which extends between a pair of teeth 207 and this lever is controlled by the plate 16 on the faucet 15, through a bell-crank lever 208, (which is trunnioned to a collar on the rod 149,) a link 209, a lever 210 and a second link 211;—the arrangement being such that when said plate occupies the position shown in Fig. 2, the lever 206 lies between the teeth 207, thereby preventing movement of the plate 200. When, however, the faucet is withdrawn from its normal position, the corresponding outward movement of the rod 149 actuates the bell-crank lever 208 and withdraws the lever 206 from the teeth 207, thereby making it possible to move the plate 200.

Adjacent the topmost portions of the coin chutes 51, 52 and 53, I mount locking levers of the construction shown in Figs. 26, 27 and 30, for preventing movement of the plate 200 after a coin has been forced into one of its slots, until the handle 26 has been operated to discharge the coin and start the machine as above described, at which time the plate 200 is automatically unlocked. For this purpose I mount by each of the coin chutes, for example that indicated at 53, a spindle 212 and fix to this a coin-actuated locking lever 213, a single toothed ratchet 214 and a projecting arm 215. The lever 213 has one arm 216 which projects into the coin chute 53 while its other arm 217 is designed to coöperate with a pair of teeth 200ª in the adjacent face of the plate 200. Said spindle with its associated parts is carried in suitable bearings preferably formed in a block 218 mounted on the upper end of the chute and also serves to support a second spindle 219 on which is mounted a pawl 220 designed to coöperate with the ratchet 214. A spring 221 is connected to the arm 215 in such manner as to normally hold the spindle 212 in position to cause the arm 216 of the lever 213 to project into the coin chute, and the pawl 220 is provided with an extension 222 perforated for the reception of one end of a push rod 223 which carries a spring 224 normally holding said pawl in engagement with the ratchet 214. Locking members similar to those shown in Fig. 30 are provided for the other two coin chutes 51 and 52 and each of them is capable of locking the plate 200 with one of its slots over the coin chute 51 or 52 as the case may be.

For the purpose of releasing the pawls 220, the rods 223 which pass through their perforated arms 222 respectively, are each pivotally connected to an arm 225 and all of these arms are fixed to a shaft 226 having a fourth projecting arm 227 which, through a link 228, is connected to a lever 229 (Fig. 24). This latter lever is so mounted as to be engaged by a projecting arm or lug 230 on the shaft or spindle 24 immediately before the handle 26 reaches the normal position of rest after having been turned through a part of a revolution as previously described. With this arrangement of parts it will be seen that all of the coin slots are normally closed and before the machine can be put in operation as described, it is necessary to first draw out the faucet 15 and hold or fasten it in or to the container or receptacle to which it is desired to deliver gasolene or other liquid. This moving away of the plate 16 from the flat face of the casing 1 permits outward movement of the rod 149 under the action of its spring and the consequent outward movement of the lever 208 attached thereto. Said lever, through the link 209, lever 210 and link 211, thereupon draws the latch formed by one arm of the lever 206 out of engagement with the teeth 207 of the plate 200. In this connection it is noted that one of these teeth is provided with an inclined approach, while the links, etc., connecting the levers 206 and 208 include a yieldable connection whereby it is possible for the plate 200 to be returned to its locked position without interference from said lever 206 even though the faucet-carried plate 16 should be already in its innermost position. The plate 200 being now unlocked, it is possible, by means of the headed rod 205, to move it inwardly until one of its slots, i. e., that indicated at 201, registers with the corresponding slot 47 and the coin chute 53. While said plate is held in this position a coin of the proper denomination is placed in the open slot and in being forced downwardly therein is caused to act on the arm 216 of the lever 213, thus forcing its locking arm 217 between the teeth 218 of the plate. This oscillation of said lever turns the shaft 212 against the action of its spring 221 and likewise turns the ratchet 214 so that the pawl 220 falls behind its single tooth, thus retaining the locking arm 217 in position to prevent further movement of the plate 200.

The other parts of the mechanism are now operated as described and as the handle 26 is returned to its normal position, the last part of its movement causes its arm 230 to strike the lever 229 and through the link 228, arm 227, and shaft 226, to move all of the rods 223 with their corresponding pawls. As a consequence, the pawl engaged with the ratchet 214 disengages the same, thereby leaving the lever 213 free to move out of engagement with the teeth of the plate 200 which is then free to move under the action of its spring 204 to its normal position with all of the slots in the casing closed. Since the revolution of the handle 26 has permitted the coin to fall out of the chute 53, there is no objection to the plate 200 being again moved into position to allow of the introduction of a second coin without possibility of injury to the machine.

The above described arrangement of parts is particularly valuable for insuring that the faucet 15 and its attached delivery pipe shall be in their extended positions when the machine is put in operation, since otherwise liquid which had been paid for by a customer would be bypassed from the time the machine started until the faucet was drawn out.

As shown in Figs. 26, 27 and 29, plate locking mechanism similar to that for the coin chute 53 is provided in position to be actuated by suitable coins introduced into the chutes 51 and 52 after the plate 200 has been properly adjusted as above described.

If for any reason it should be found advisable to control the operation of the machine by hand rather than by coins, I may omit the coin chutes and in their place provide three push rods 231, 232 and 233 in positions to coöperate with the levers 44, 45 and 46 respectively. These rods are guided in suitable openings in the casings 1 and 21 in such manner as to respectively engage the ends of their coöperating levers and each of them is provided with a head 234 between which and the adjacent surface of the casing 1 is confined a spring 235, whereby it is normally maintained in an elevated position defined or limited by a collar 236 fixed to it immediately inside of said casing. Obviously a downward pressure on any of the rods depresses the corresponding lever 44, 45 or 46, with the same functional effect on the mechanism as is produced by a coin.

I claim:—

1. The combination of a pump; a motor; means connecting said pump and motor; a manually operated member for starting the motor; a second member controlling the means for connecting the motor and pump; and coin-controlled means for governing the operation of said latter member.

2. The combination of a pump; a motor therefor; a manually operated member for causing starting of the motor; a second manually operated member controlling the connection of the motor to the pump; and coin-controlled means connected to govern the operation of said latter member.

3. The combination of a pump; a motor therefor; a manually operated member for starting the motor; a second member controlling the connection of the motor and pump; and coin-controlled means connected to govern the operation of both of said members.

4. The combination of a pump; a source of power therefor; a separable connection between the source and the pump; and coin-controlled hand operated means for causing said connection to become operative to transmit power from the source to the pump; with manually operated means for starting the pump.

5. The combination of a pump; a source of power therefor; a clutch between the source of power and the pump; and a plurality of coin-controlled devices respectively responsive to coins of different denominations for operating said clutch to cause it to transmit power from the source to the pump for times dependent on the denominations of the coin inserted.

6. The combination of a pump; a motor therefor; a manually controlled member for operatively connecting the pump and motor; and coin-controlled means for rendering said member operative at will; with a valve for the pump operatively connected to the manually controlled member.

7. The combination of a pump; a motor therefor; means connecting the motor and pump; means for starting the motor; a manually operated member controlling both of said means; and coin-controlled mechanism governing the operation of the member.

8. The combination of a pump; a motor therefor; means operatively connecting the pump and motor; means for starting the motor; a device normally locking said starting means; and a manually operated coin-controlled member governing the operation of both of said means and controlling said device.

9. The combination of a pump; a motor; a switch-governing member controlling starting of the motor; a manually operated element for actuating said member; and coin-controlled means for operatively connecting said member and said element.

10. The combination of a pump; a motor; a switch-governing member for controlling starting of the motor; a manually operated element for actuating said member; and coin-controlled means for operatively connecting said member and said element, the same including a manually operated device.

11. The combination of a pump; a motor therefor; a member for starting said motor; means for normally locking said member from movement; a manually operated element for moving the member; means for transmitting movement from said element to said member; and coin-controlled mechanism governing the operation of said locking means and said means.

12. The combination of a pump; a motor therefor; a motor starting member; a manually operated member for actuating said first member; a coin-controlled element for connecting said members; and a manually controlled device for holding the motor starting member in a given position.

13. The combination of a pump; a motor therefor; a motor starting member; a manually operated member for actuating said first member; and a coin-controlled manually operated element for connecting said members.

14. The combination of a pump; a motor therefor; a normally unlocked motor starting member; a manually operated member for actuating the first member; and coin-controlled means for connecting said members and temporarily locking the motor starting member.

15. The combination of a pump having a movable delivery conduit; a by-pass for the pump; coin-controlled means for governing the operation of the pump; and means operated by said conduit for controlling the flow of liquid through the by-pass.

16. The combination of a pump; an extensible delivery conduit therefor; a by-pass for the pump; coin-controlled means for governing operation of the pump; and a device controlled by said conduit for governing flow of liquid through the by-pass.

17. The combination of a pump having an extensible delivery conduit; a by-pass conduit for the pump; a valve in said conduit; coin-controlled means for governing the operation of the pump; and mechanism including a member placed to be operated by the delivery conduit for actuating the by-pass valve.

18. The combination of a pump having an extensible delivery conduit; a by-pass for the pump including a valve; coin-controlled means governing the operation of the pump;

and a member engaged by the delivery conduit when it is in a retracted position, for opening the by-pass valve.

19. The combination of a pump having an extensible delivery conduit; a by-pass for the pump including a valve; coin-controlled means governing the operation of the pump; a member engaged by the delivery conduit when it is in a retracted position, for opening the by-pass valve; and means for automatically closing said valve when the conduit is moved from its normal position.

20. The combination of a pump; an inlet valve therefor; coin-controlled means for governing operation of the pump; and a manually operated member also governed by said means for opening said valve.

21. The combination of a pump; an inlet valve therefor; coin-controlled means for governing operation of the pump; a manually operated member governed by said means for opening said valve; with an element also controlled by said means for normally disconnecting said manually operated member and the valve operating means.

22. The combination of a pump having a delivery conduit; a valve for said conduit; a motor; coin-controlled means for governing operation of the motor; and a clutch between the pump and motor adjusted to slip when said valve is closed while the motor is operating.

23. The combination of a pump; a motor therefor; a member for starting said motor; a push rod for actuating said member; a swinging element; and coin-controlled means for moving said element in position to connect the push rod and the motor starting member.

24. The combination of a pump; a motor; a clutch for operatively connecting said pump and motor; coin-controlled means for causing operative connection of the elements of the clutch; and means for automatically disconnecting said clutch elements after the pump has made a predetermined number of strokes.

25. The combination of a pump; a motor; a clutch for operatively connecting said pump and motor; coin-controlled manually actuated means for causing operative connection of the elements of the clutch; and means for automatically disconnecting said clutch elements after the pump has delivered a predetermined quantity of liquid.

26. The combination of a pump; a motor therefor; a manually operated coin-controlled device for causing starting of the motor; means dependent on the denomination of the coin inserted for determining the duration of the operation of the pump; and means for automatically stopping the motor after the pump has delivered a predetermined quantity of liquid.

27. The combination of a pump; a motor therefor; a coin-controlled member for causing starting of the motor; an element for holding said member in position to permit continued operation of the motor; and means for automatically releasing said element from said member after the pump has delivered a predetermined quantity of liquid; with means for causing the time of operation of said releasing means to vary with the denomination of the coin inserted.

28. The combination of a pump; a motor therefor; a valve for the pump; coin-controlled manually actuated means for opening said valve and causing starting of the motor; and mechanism for automatically stopping the motor and closing the valve when the pump has delivered a predetermined quantity of liquid.

29. The combination of a pump; a motor therefor; a member for causing starting of said motor; a manually operated member; a coin-controlled device for causing power to be transmitted between said members; and means for moving said device to disconnect the members after the pump has delivered a predetermined quantity of liquid.

30. The combination of a pump; a valve controlled by-pass for said pump; a valved delivery conduit; a motor for the pump; coin-controlled means for governing the starting of the motor; automatic means for stopping the motor when the pump has delivered a predetermined quantity of liquid; and a device for automatically opening the valve and the by-pass when the valve in the delivery conduit is closed before a predetermined quantity of liquid has been discharged.

GEORGE C. K. CULMER.

Copies of this patent may be obtained for five cents each, by addressing the "Commissioner of Patents, Washington, D. C."